(12) United States Patent
Yu et al.

(10) Patent No.: US 9,775,185 B2
(45) Date of Patent: Sep. 26, 2017

(54) MANAGEMENT OF RADIO RESOURCE CONTROL FOR DEVICE-TO-DEVICE COMMUNICATION

(71) Applicant: Nokia Solutions and Networks Oy, Espoo (FI)

(72) Inventors: Ling Yu, Espoo (FI); Vinh Van Phan, Oulu (FI); Yang Liu, Beijing (CN); Haitao Li, Beijing (CN); Zexian Li, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 147 days.

(21) Appl. No.: 14/764,613

(22) PCT Filed: Feb. 1, 2013

(86) PCT No.: PCT/EP2013/052036
§ 371 (c)(1),
(2) Date: Jul. 30, 2015

(87) PCT Pub. No.: WO2014/117858
PCT Pub. Date: Aug. 7, 2014

(65) Prior Publication Data
US 2015/0373764 A1    Dec. 24, 2015

(51) Int. Cl.
*H04W 4/00* (2009.01)
*H04W 76/02* (2009.01)
(Continued)

(52) U.S. Cl.
CPC ......... *H04W 76/023* (2013.01); *H04W 28/16* (2013.01); *H04W 76/06* (2013.01)

(58) Field of Classification Search
None
See application file for complete search history.

(56) References Cited

U.S. PATENT DOCUMENTS

| 2010/0009675 A1 | 1/2010 | Wijting et al. ............ 455/426.1 |
| 2012/0063464 A1* | 3/2012 | Mehta ................... H04W 28/02 370/401 |

(Continued)

FOREIGN PATENT DOCUMENTS

| WO | WO 2011/116815 A1 | 3/2010 |
| WO | WO 2011/147468 A1 | 5/2010 |
| WO | WO 2012/166969 A1 | 12/2012 |

*Primary Examiner* — Edan Orgad
*Assistant Examiner* — Rebecca Song
(74) *Attorney, Agent, or Firm* — Harrington & Smith

(57) ABSTRACT

Measures are provided for management of RRC for D2D communication. Such measures include setting a connected state of RRC for device(s) of a pair of devices. For the devices(s), both a D2D communication service between the pair of devices and a core network communication service between the device(s) and a core network entity are active. The setting enables radio resource management for the device(s) for the D2D communication service and the core network communication service. Termination of the core network communication service is detected for the device(s). A connection towards the core network entity is reconfigured for disabling the core network communication service of the device(s). The connected state of RRC is maintained for the devices(s) of the pair of devices, for which the device(s) only the device-to-device communication service is active. The maintaining enables radio resource management for the device(s) for the D2D communication service.

20 Claims, 5 Drawing Sheets

(51) Int. Cl.
*H04W 28/16* (2009.01)
*H04W 76/06* (2009.01)

(56) References Cited

U.S. PATENT DOCUMENTS

| | | | |
|---|---|---|---|
| 2012/0134344 A1 | 5/2012 | Yu et al. | 370/336 |
| 2012/0270554 A1 | 10/2012 | Hellwig et al. | 455/445 |
| 2013/0064158 A1* | 3/2013 | Sundell | H04W 76/02 370/311 |
| 2013/0287012 A1* | 10/2013 | Pragada | H04W 76/045 370/338 |
| 2014/0334418 A1* | 11/2014 | Urie | H04W 40/02 370/329 |
| 2015/0036495 A1* | 2/2015 | Venkatachalam | H04W 28/0215 370/235 |

* cited by examiner

⇔ D2D communication (data plane)

⟵⟶ control plane

MANAGEMENT OF RADIO RESOURCE CONTROL FOR DEVICE-TO-DEVICE COMMUNICATION

FIELD

The present invention relates to a management of radio resource control for device-to-device communication. More specifically, the present invention exemplarily relates to measures (including methods, apparatuses and computer program products) for the management of radio resource control for device-to-device communication.

BACKGROUND

In cellular communication systems, various techniques for enhancing any one of bandwidth, throughput, system coverage and performance are studied in view of respective limitations inherent to conventional operations of cellular communications. In this regard, device-to-device (D2D) communication is developed for providing a D2D communication mode or service between a pair of devices (such as terminals or user equipment operable in a cellular communication system like a LTE/LTE-A system), in which at least a core network of the communication system is not involved, in addition to a conventional communication mode or service (also referred to as infrastructure mode or service) between devices (such as terminals or user equipment operable in a cellular communication system like a LTE/LTE-A system) and the core network of the communication system (such as an EPC of a LTE/LTE-A system).

Such D2D communication is generally applicable to any pair of devices in mutual proximity, which is why the D2D communication mode or service may also be referred as proximity mode or service. Examples of D2D communication may include direct communications in a cluster of proximity devices, D2D communications in a cellular network, or the like. A communication (data) path for such D2D communication may be arranged directly between the involved devices, which is referred to as direct path or mode, or may be arranged via at least one serving base station of the cellular communication system, which is referred to as locally-routed/optimized path or mode.

Typically, such D2D communication is subject to network control, thus being referred to as network- or operator-controlled D2D communication. For example, the devices involved in a D2D communication may be controlled in terms of resource management and/or connection management by network entities, i.e. radio access network entities such as a base station (e.g. an eNB of a LTE/LTE-A system) and core network entities such as a mobility management entity (MME) and/or a D2D registration server function (DRSF).

For D2D communication, both under optimized path and direct path, it is adopted that radio resources for the involved pair of devices should be controlled/managed by way of the RRC layer, i.e. via a RRC connection, so as to enable execution of (D2D) radio bearer setup/modification/release procedures and the like.

In current cellular communication systems, a RRC layer is defined, i.e. a RRC connection between a terminal or user equipment and a base station is established, which is in charge of controlling/managing radio resources between the terminal or user equipment and the network side for core network communication. For example, in LTE/LTE-A systems, a RRC layer is defined between UE and eNB for controlling/managing radio resources for conventional EPS services and/or NAS services. Herein, both EPS services (i.e. user-plane services, such as e.g. voice or data services used by a user) and NAS services (i.e. control plane services, such as e.g. a tracking area update) may be commonly referred to as core network (CN) communication services. Such RRC layer/connection is established to support core network communication such as EPS bearer transmission and/or NAS PDU transmission between the core network and the UE, which means that the RRC layer/connection in a LTE/LTE-A system will only exist when it is associated with a bearer towards the core network side, e.g. a S1 bearer or a S5 bearer. Stated in other words, there will be at least an EPS bearer and/or NAS signaling connection existing between the core network and the UE for a typical RRC_Connected state according to current specifications, which means that the RRC_Connected state is combined with an existing EPS service and/or NAS service, i.e. the RRC connection provides a tunnel for upper layer data transmission e.g. NAS PDUs towards the core network. Accordingly, any CN communication service (i.e. any EPS and/or NAS service) conventionally requires existence/availability of both a RRC layer/connection and a S1 bearer.

For D2D communication, both under optimized path and direct path, there is no requirement or restriction that a core network communication is established, i.e. an EPS service or bearer transmissions and/or a NAS service or signaling connection is active. In the case that no core network communication is established, i.e. no EPS service or bearer transmission and no NAS service or signaling connection is active, no RRC layer/connection is established either. Stated in other words, since a typical RRC_Connected state according to current specifications is combined with an existing EPS service and/or NAS service, the related RRC connection to certain devices will be released (i.e. the RRC state will be set to RRC_Idle), once no EPS service and no NAS service is active, i.e. once no dedicated EPS bearers and/or NAS signaling connections for the certain devices are available. In the absence of a RRC connection to devices involved in a D2D communication, i.e. with these devices being set in the RRC_Idle state, due to the lack of an EPS service and/or NAS service for these devices, no radio resource control/management for a D2D communication of these devices can thus be handled by way of RRC according to current specifications, namely RRC in charge of handling radio resource control/management for core network communication services.

That is, management of radio resources for D2D communication becomes an issue, since the RRC layer/connection will be released immediately when the combined core network communication service (i.e. EPS service and/or NAS service) is over. In view thereof, an RRC layer/connection could not be utilized for radio resource control/management for D2D communication in a reliable manner.

Therefore, there resides a problem in how to manage radio resource, or how to manage radio resource control states, for D2D communication to support such radio resource management without a requirement or restriction that a core network communication needs to be established for at least one device involved in the D2D communication.

Accordingly, there is a demand for an appropriate management of radio resource control for device-to-device communication.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method for managing radio resource control, comprising setting a connected state of radio resource control for at least one device of a pair of devices, for which at least one device both a device-to-device communication service between the pair of devices and a core network communication service between the at least one device and a core network entity are active, said setting enabling radio resource management for the at least one device for the device-to-device communication service and the core network communication service, detecting termination of the core network communication service for the at least one device, reconfiguring a connection towards the core network entity for disabling the core network communication service of the at least one device, and maintaining the connected state of radio resource control for the at least one device of the pair of devices, for which at least one device only the device-to-device communication service is active, said maintaining enabling radio resource management for the at least one device for the device-to-device communication service.

According to an exemplary aspect of the present invention, there is provided a method for managing radio resource control, comprising setting a connected state of core network connection management for at least one device of a pair of devices, for which at least one device both a device-to-device communication service between the pair of devices and a core network communication service between the at least one device and a core network entity are active, said setting enabling core network connection management for the at least one device, detecting termination of the core network communication service for the at least one device, determining reconfiguration of a connection towards a radio access network entity for disabling the core network communication service of the at least one device, and setting a non-connected state of core network connection management for the at least one device of the pair of devices, for which at least one device only the device-to-device communication service is active, said setting disabling core network connection management for the at least one device.

According to an exemplary aspect of the present invention, there is provided an apparatus configured for managing radio resource control, comprising an interface configured to communicate with at least another apparatus, a memory configured to store computer program code, and a processor configured to cause the apparatus to perform: setting a connected state of radio resource control for at least one device of a pair of devices, for which at least one device both a device-to-device communication service between the pair of devices and a core network communication service between the at least one device and a core network entity are active, said setting enabling radio resource management for the at least one device for the device-to-device communication service and the core network communication service, detecting termination of the core network communication service for the at least one device, reconfiguring a connection towards the core network entity for disabling the core network communication service of the at least one device, and maintaining the connected state of radio resource control for the at least one device of the pair of devices, for which at least one device only the device-to-device communication service is active, said maintaining enabling radio resource management for the at least one device for the device-to-device communication service.

According to an exemplary aspect of the present invention, there is provided an apparatus configured for managing radio resource control, comprising an interface configured to connect to at least another apparatus, a memory configured to store computer program code, and a processor configured to cause the apparatus to perform: setting a connected state of core network connection management for at least one device of a pair of devices, for which at least one device both a device-to-device communication service between the pair of devices and a core network communication service between the at least one device and a core network entity are active, said setting enabling core network connection management for the at least one device, detecting termination of the core network communication service for the at least one device, determining reconfiguration of a connection towards a radio access network entity for disabling the core network communication service of the at least one device, and setting a non-connected state of core network connection management for the at least one device of the pair of devices, for which at least one device only the device-to-device communication service is active, said setting disabling core network connection management for the at least one device.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

The computer program product may comprise or may be embodied as a (tangible) computer-readable (storage) medium or the like, on which the computer-executable computer program code is stored, and/or the program is directly loadable into an internal memory of the computer or a processor thereof.

Advantageous further developments or modifications of the aforementioned exemplary aspects of the present invention are set out in the following.

By way of exemplary embodiments of the present invention, there is provided management of radio resource control for device-to-device communication.

By virtue of exemplary embodiments of the present invention, it is enabled to manage radio resource, or to manage radio resource control states, for device-to-device communication to support such radio resource management without a requirement or restriction that a core network communication needs to be established for at least one device involved in the device-to-device communication.

Thus, improvement is achieved by methods, apparatuses and computer program products enabling/realizing management of radio resource control for device-to-device communication.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, for explaining applicability of thus described exemplary embodiments in an illustrative manner, a LTE/LTE-A system is used as a non-limiting example of a cellular communication system. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, the present invention and its embodiments may be applicable in any cellular communication system and/or system deployment in which device-to-device (D2D) communication between a pair of devices is feasible.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) management of radio resource control for device-to-device (D2D) communication.

Figure 1:
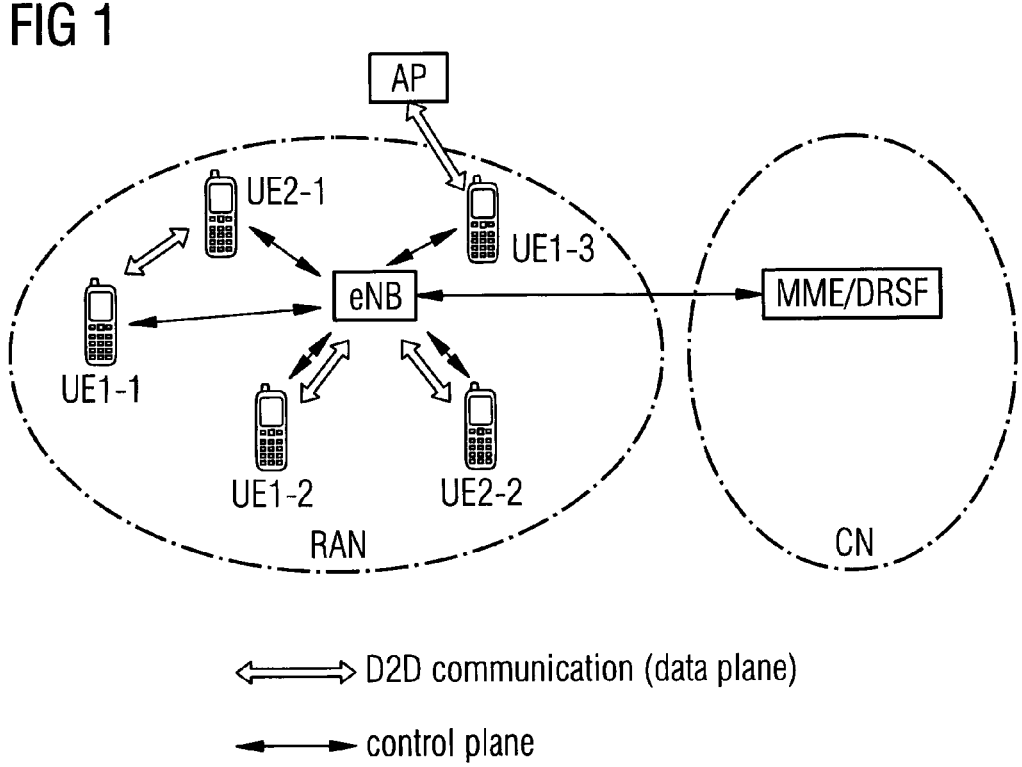
FIG. 1 shows a schematic diagram illustrating a communication system scenario, for which exemplary embodiments of the present invention are applicable.

FIG. 1 shows a schematic diagram illustrating a communication system scenario, for which exemplary embodiments of the present invention are applicable.

As shown in FIG. 1, a communication system scenario, for which exemplary embodiments of the present invention are applicable, basically comprises a radio access network RAN and core network CN. Assuming a LTE/LTE-A system deployment, a RAN entity is exemplified as a base station eNB, and a CN (EPC) entity is exemplified as a MME/DRSF (wherein the MME and the DRSF may be collocated at a single network element or separate in different network elements). In the service area of the RAN, especially the exemplified base station eNB, various terminals or user equipments UE are exemplified as devices, which are operable in the communication system and which are capable for performing a D2D communication. Further, an access point AP (e.g. a WiFi AP) is exemplified as a device, which is not operable in the communication system but which is capable for performing a D2D communication.

As mentioned above, a D2D communication may take place directly between a pair of devices, i.e. under a direct path or mode, or between a pair of devices via at least one serving base station, i.e. under a locally-routed/optimized path or mode. In FIG. 1, the pair of devices UE1-1 and UE2-1 are exemplified to perform a D2D communication under a direct path or mode, i.e. the data path or plane is UE1-1←→UE2-1, while the pair of devices UE1-3 and AP are exemplified to perform a D2D communication under a direct path or mode, i.e. the data path or plane is UE1-3←→AP, in an out-of-band manner (i.e. using different radio resources as the eNB, e.g. WiFi radio resources on an unlicensed band). In this case, at least one of the UEs has a control-plane related bearer to the eNB (manageable/controllable via a corresponding RRC connection). Further, the pair of devices UE1-2 and UE2-2 are exemplified to perform a D2D communication under a locally-routed/optimized path or mode, i.e. the data path or plane is UE1-2←→eNB←→UE2-2. In this case, both UEs have a D2D-related bearer to the eNB (manageable/controllable via a corresponding RRC connection). In both cases of LTE/LTE-A-operable device pairs, the control plane is UE1-X←→eNB←→UE2-X (X being 1 or 2) via corresponding RRC connections.

Accordingly, each LTE/LTE-A-operable device has a control plane to the MME/DRSF via the eNB. On this control plane, a signaling connection between UE and MME/DRSF may be established, which is made up of two parts, namely a RRC connection between the UE and the eNB and a S1 connection between the eNB and the MME/DRSF (e.g. a S1_MME connection between the eNB and the MME). The resources of a CN communication service (such as an EPS service, a NAS service, etc.) and the resources of a D2D communication service of such devices may thus be controlled/managed on/via the respective RRC connection between the eNB and any one such devices (as long as such RRC connection remains established).

It is noted that the aforementioned signaling connection between UE and MME/DRSF only exits when a D2D connection is established. During a D2D communication service, this signaling connection may be released. According to current standard specifications, the UE is in connected state only when the signaling connection between the UE and the MME/DRSF exists, as explained above. According to exemplary embodiments of the present invention, as explained below, the signaling connection between the UE and the MME/DRSF may be established (i.e. the UE is held in connected state) for controlling and managing D2D connection establishment even there is no CN communication service is ongoing at the same time. After the D2D connection is established, core network involvement may not be needed. Therefore, the signaling connection between the UE and the MME/DRSF can be released, while the release of the RRC connection at the eNB is not triggered.

Figure 2:
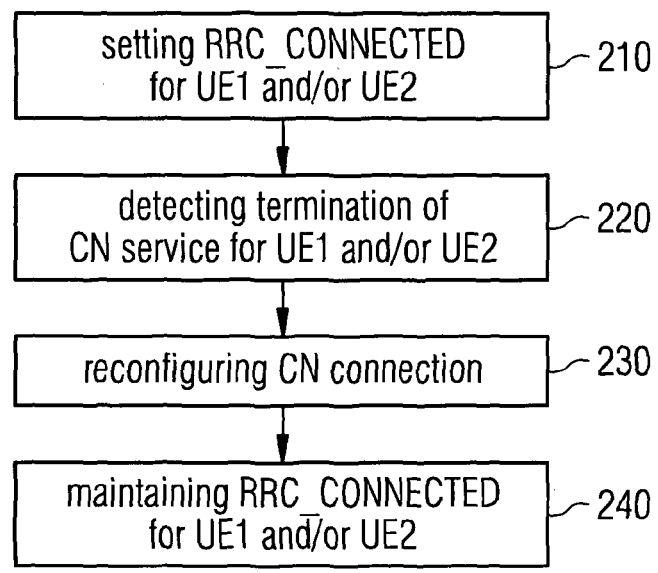
FIG. 2 shows a flowchart of an exemplary method according to exemplary embodiments of the present invention, which is operable at a radio access network entity of a cellular communication system.

FIG. 2 shows a flowchart of an exemplary method according to exemplary embodiments of the present invention, which is operable at a RAN entity of a cellular communication system, such as the eNB in the communication system scenario of FIG. 1.

As shown in FIG. 2, a method for managing radio resource control according to exemplary embodiments of the present invention comprises an operation (S210) of setting a connected state of radio resource control (RRC_CONNECTED) for at least one device of a pair of devices, or—stated differently—setting at least one device of a pair of devices in a connected state of radio resource control (RRC_CONNECTED). At this time, this at least one device has both an active D2D communication service between the pair of devices and an active CN communication service between the at least one device and a CN entity (e.g. the MME/DRSF in the communication system scenario of FIG. 1). Hence, the setting of RRC_CONNECTED for the at least one device enables radio resource management for the at least one device for the D2D communication service and the CN communication service. Stated in other words, a RRC connection is established between the at least one device and the RAN entity (e.g. the eNB in the communication system scenario of FIG. 1). Further, the method comprises an operation (S220) of detecting termination of the CN communication service for the at least one device. Upon such detection operation (as a result of which no active CN communication service remains active between the pair of devices in question and the CN entity), the method further comprises an operation (S230) of reconfiguring a connection towards the CN entity for disabling the CN communication service of the at least one device (i.e. disabling support of the CN communication service via/on a S1 connection between the RAN entity and the CN entity), and an operation (S240) of maintaining the connected state of radio resource control (RRC_CONNECTED) for the at least one device, or—stated differently—maintaining the at least one device in the connected state of radio resource control (RRC_CONNECTED).

At this time, this at least one device has only an active D2D communication service between the pair of devices. Hence, the maintaining of RRC_CONNECTED for the at least one device still enables radio resource management for the at least one device for the D2D communication service (although the CN communication service has been terminated). Stated in other words, the RRC connection between the at least one device and the RAN entity is not released but remains existing.

The termination of the CN communication service may be detected in operation 220 for example by obtaining (e.g. from the core network entity) a command for releasing all of active device-dedicated bearers of the at least one device towards the core network entity, and/or by (locally) sensing inactivity on all of active device-dedicated bearers of the at least one device towards the core network entity.

The connection towards the CN entity may be reconfigured in operation 230 for example by releasing all of active device-dedicated bearers of the at least one device towards the core network entity, or by establishing a virtual bearer for the pair of devices towards the core network entity.

Figure 3:
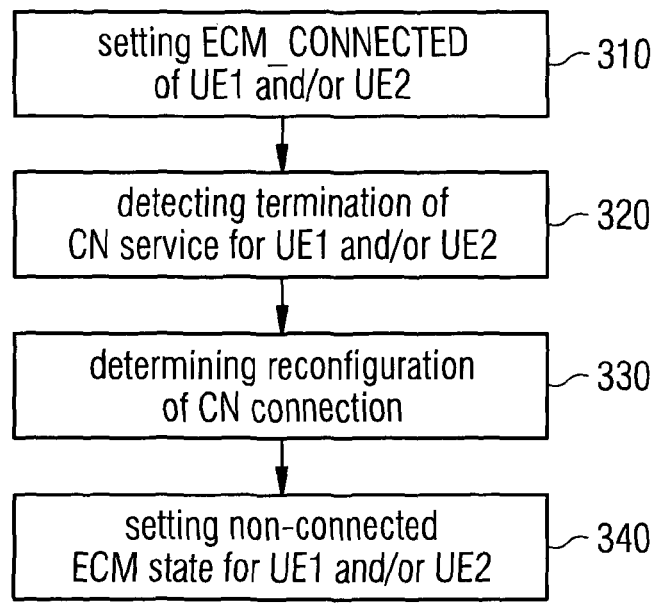
FIG. 3 shows a flowchart of an exemplary method according to exemplary embodiments of the present invention, which is operable at a core network entity of a cellular communication system.

FIG. 3 shows a flowchart of an exemplary method according to exemplary embodiments of the present invention, which is operable at a CN entity of a cellular communication system, such as the MME/DRSF in the communication system scenario of FIG. 1.

As shown in FIG. 3, a method for managing radio resource control according to exemplary embodiments of the present invention comprises an operation (S310) of setting a connected state of core network connection management (ECM_CONNECTED) for at least one device of a pair of devices, or—stated differently—setting at least one device of a pair of devices in a connected state of core network connection management (ECM_CONNECTED). At this time (corresponding to the time of operation S210 of FIG. 2), this at least one device has both an active D2D communication service between the pair of devices and an active CN communication service between the at least one device and the CN entity (e.g. the MME/DRSF in the communication system scenario of FIG. 1). Hence, the setting of ECM_CONNECTED for the at least one device enables CN connection management for the at least one device. Stated in other words, a signaling connection comprising a RRC connection and a S1 connection is established between the at least one device and the CN entity via the RAN entity (e.g. the eNB in the communication system scenario of FIG. 1). Further, the method comprises an operation (S320) of detecting termination of the core network communication service for the at least one device. Upon such detection operation (as a result of which no active CN communication service remains active between the pair of devices in question and the CN entity), the method further comprises an operation (330) of determining reconfiguration of a connection towards a radio access network entity for disabling the core network communication service of the at least one device (i.e. disabling support of the CN communication service via/on a S1 connection between the RAN entity and the CN entity), and an operation (340) of setting a non-connected state of core network connection management (e.g. ECM_IDLE or VIRTUAL ECM_CONNECTED) for the at least one device of the pair of devices, or—stated differently—setting the at least one device in a non-connected state of core network connection management (e.g. ECM_IDLE or VIRTUAL ECM_CONNECTED). At this time (corresponding to the time of operation S240 of FIG. 2), this at least one device has only an active D2D communication service between the pair of devices. Hence, the setting of ECM_IDLE or VIRTUAL ECM_CONNECTED or the like for the at least one device disables CN connection management for the at least one device (since the CN communication service has been terminated). Stated in other words, while the RRC connection between the at least one device and the RAN entity is not released but remains existing, the S1 connection for the at least one device between the RAN entity and the CN entity is released or at least disabled in terms of CN communication service support.

The termination of the CN communication service may be detected in operation 320 for example by obtaining (e.g. from the radio access network entity) a command for releasing all of active device-dedicated bearers of the at least one device towards the radio access network entity, and/or by (locally) sensing inactivity on all of active device-dedicated bearers of the at least one device towards the radio access network entity.

The connection reconfiguration towards the CN entity may be determined in operation 330 for example by determining a release of all of active device-dedicated bearers of the at least one device towards the core network entity, or by determining an establishment of a virtual bearer for the pair of devices towards the core network entity.

In the above description of methods according to exemplary embodiments of the present invention, the respective operations may be performed for or with respect to only one of the devices of the D2D device pair in case of a direct path or mode D2D communication (in which only one of the devices has a D2D bearer to the RAN entity), while the respective operations may be performed for or with respect to both of the devices of the D2D device pair in case of a locally-routed/optimized path or mode D2D communication (in which both of the devices have a D2D-related radio bearer to the RAN entity).

According to exemplary embodiments of the present invention, the resources of a CN communication service (such as an EPS service, a NAS service, etc.) and the resources of a D2D communication service of D2D devices may thus be controlled/managed on/via the respective RRC connection between the eNB and any one of such D2D devices, and the resources of the D2D communication service of such D2D devices may still be controlled/managed on/via the respective RRC connection between the eNB and any one of such D2D devices when the CN communication service has been terminated.

That is to say, although the CN communication service via the RAN-CN interface is terminated, i.e. the S1 connection is released or disabled, support of the D2D communication service in the RAN is maintained, i.e. the RRC connection is maintained. Thereby, in contrast to conventional mechanisms as described above, a mismatch between ECM states in the CN entity and the at least one device is accepted in that the RAN entity (residing in the middle of the signaling connection between the at least one device and the CN entity) does not effect synchronization on connection establishment and release between the two connection parts thereof, namely the RRC connection between the UE and the eNB and the S1 connection between the eNB and the MME/DRSF (e.g. a S1_MME connection between the eNB and the MME). That is to say, the eNB does not release but maintains the RRC connection to the UE/UEs of the D2D pair, although the core network connection (e.g. the UE-dedicated S1 bearer) is released. As a result of the above-described methods according to exemplary embodiments of the present invention, the UE is held in a non-connected ECM state, such as ECM_IDLE, VIRTUAL ECM_CONNECTED or the like, at the CN entity (due to S1 connection release or disabling), but remains (i.e. sees itself) still in RRC_CONNECTED state as well as in ECM_CONNECTED state (due to RRC connection maintenance).

Figure 4:
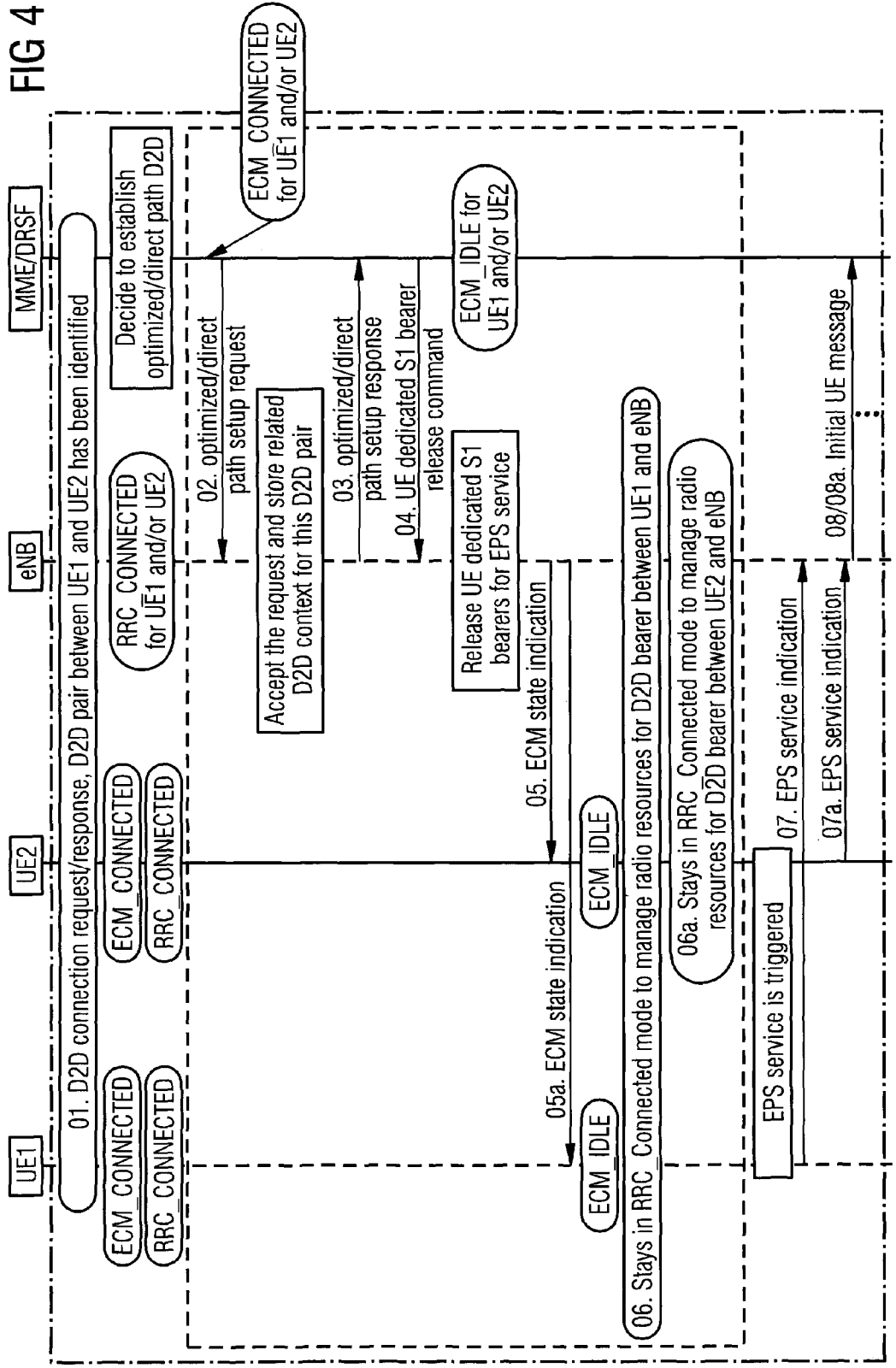
FIG. 4 shows a signaling diagram of a first example of a procedure according to exemplary embodiments of the present invention.

FIG. 4 shows a signaling diagram of a first example of a procedure according to exemplary embodiments of the present invention. The exemplary procedure illustrated in FIG. 4 is based on the assumption of a D2D communication (service) between devices UE1 and UE2 under the direct path or mode (in which both of the devices UE1 and UE2 have a D2D-related radio bearer to the eNB), as exemplified for devices UE1-2 and UE2-2 in the communication system scenario of FIG. 1.

In the procedure of FIG. 4, an approach is exemplified, in which the MME/DRSF enters UE1 and/or UE2 into the ECM_IDLE state (representing an example of a non-connected ECM state resulting from CN connection reconfiguration) but the RRC state for UE1 and/or UE2 remains in RRC_CONNECTED at the eNB. In this procedure, the ECM_IDLE state for UE1 and/or UE2 is attained by releasing a S1 bearer between the eNB and the MME/DRSF.

As shown in FIG. 4, a D2D communication service between UE1 and UE2 is activated in addition to an existing EPS communication service of UE1 and UE2 towards the MME/DRSF. Namely, in step 1, a D2D service is going to be initiated between UE1 and UE2, and the MME/DRSF will be able to identify the pair and establish a link between UE1 and UE2, with involvement of the eNB. Then, the MME/DRSF decides to set up a communication path for this D2D pair (in the present example, a locally-routed/optimized path via the eNB). At this time, both UEs are in ECM_CONNECTED state and RRC_CONNECTED state, the eNB holds both UEs in RRC_CONNECTED state, and the MME/DRSF holds both UEs in ECM_CONNECTED state.

In step 2, the MME/DRSF sends an indication message regarding its communication path setup decision to the eNB to execute a corresponding communication path setup procedure. That is, the MME/DRSF issues and the eNB thus obtains a request for setting up a communication path between the pair of devices for the D2D communication service, wherein the request comprises D2D context information for the pair of devices, related with both UE1 and UE2. Such request may be implemented by a S1AP message which may be specifically defined for such purpose. Such S1AP message is configured to serve, i.e. to be associated/related with, no CN or EPS (e.g. S1 and/or S5) bearer between the eNB and the MME/DRSF. Upon receipt of such request, the eNB sets up the communication path between the pair of devices according to the request. In the present case of a request for a locally-routed/optimized path, the eNB establishes a radio bearer for the D2D communication service to any one of UE1 and UE2, i.e. two D2D radio bearers (without relation to or association with a S1 bearer). Further, the eNB may register or store the obtained D2D context information for the pair of devices for further use.

In step 3, the eNB may send a confirmation message regarding its communication path setup to the MME/DRSF.

In case the CN communication service of UE1 and/or UE2 comes to the end and there is no need to maintain the corresponding UE-dedicated EPS bearer any more, the MME/DRSF could instruct the eNB to release the corresponding UE-dedicated S1 bearers between the MME/DRSF and the eNB. That is, in step 4, the MME/DRSF issues and the eNB thus obtains a command for releasing the device-dedicated bearers of the at least one device between the eNB and the MME/DRSF, i.e. all active device-dedicated bearers of the at least one device such that no device-dedicated bearer remains active. Such command may be implemented by a S1AP message which may be specifically defined for such purpose. Such S1AP message is configured to serve, i.e. to be associated/related with, no CN or EPS (e.g. S1 and/or S5) bearer between the eNB and the MME/DRSF. It is noted that this step of command transmission could be merged into step 2 of request transmission, if the CN communication service is already terminated at the beginning of step 2.

For example, as assumed in the procedure of FIG. 4, the MME/DRSF may detect termination of the core network communication service for the at least one device on its own (e.g. by sensing inactivity on all of related UE-dedicated bearers), and the eNB may detect such termination by way of obtaining a corresponding command from the MME/DRSF. Otherwise, the eNB may detect termination of the core network communication service for the at least one device on its own (e.g. by sensing inactivity on all of related UE-dedicated bearers), and the MME/DRSF may detect such termination by way of obtaining a corresponding command from the eNB. Upon receipt of such command or upon inactivity detection, the eNB reconfigures the CN connection towards the MME/DRSF for disabling the CN communication service of the at least one device by releasing the device-dedicated bearer of the at least one device (for the CN communication service) towards the MME/DRSF. Such reconfiguration of the CN connection towards the eNB may then be determined by the MME/DRSF accordingly. The MME/DRSF may specifically determine release of the S1 bearer as a result of the thus determined CN connection reconfiguration.

Upon (detection of the need/desire for) such S1 bearer release as an example of a CN connection reconfiguration according to exemplary embodiments of the present invention, the UE-related states may be managed as follows. The MME/DRSF sets an ECM_IDLE state as an example of a non-connected ECM state for UE1 and UE2, while the eNB maintains the RRC_CONNECTED state for UE1 and UE2. The eNB may thus perform radio resource management (RRC control) for the D2D communication service for the at least one device on the set-up communication path when the RRC_CONNECTED state is maintained for the at least one device for which only the D2D communication service is active.

In step 5, the eNB may then set the ECM_IDLE state for UE1 and/or UE2, whereby the CN connection management for the at least one device is disabled, and may optionally indicate the setting of the ECM_IDLE state to UE1 and/or UE2. Correspondingly, UE1 and/or UE2 will be optionally informed for ECM_IDLE state held by the MME/DRSF based on the indication from the eNB. It is to be noted that at this time the MME/DRSF is not maintaining any EPS bearer any more due to no CN communication service happening between UE1/UE2 and the MME/DRSF.

Although UE1 and UE2 will thus be seen to be in ECM_IDLE state from MME/DRSF point of view, both UE1 and UE2 will still remain in RRC_CONNECTED state. As shown as step 6, both UE1 and UE2 stay in RRC_CONNECTED state with respect to their D2D bearers to the eNB, respectively. Thus, it is still enabled to manage radio resources for the locally-routed/optimized path D2D service between UE1/UE2 and eNB. For example, for both UE1 and UE2, at least one radio bearer for the D2D service is established/activated between this UE and the eNB. In this case, the RRC connection between this UE and the eNB is valid only for managing D2D services on the air interface while there is no relationship/association with any CN communication service any more, e.g. no NAS messages will be transmitted in this RRC connection and no EPS bearers will be active.

In case at a later time at least one of the D2D pair decides to initiate a CN communication such as e.g. an EPS service, UE1 and/or UE2 could indicate such CN communication (e.g. EPS service) request to the eNB via the remaining RRC connection using any uplink RRC messages (e.g. measurement report or uplink information transfer). Then, the eNB will issue an initial UE message to the MME/DRSF based on legacy procedures to re-establish the CN communication (e.g. the EPS service).

The exemplary procedure illustrated in FIG. 4 is similarly applicable for a D2D communication (service) between devices UE1 and UE2 under the direct path or mode (in which one or both of the devices UE1 and UE2 may have a control-plane bearer to the eNB, i.e. at least one of UE1 and UE2 is in RRC_CONNECTED state), as exemplified for devices UE1-1 and UE2-1 in the communication system scenario of FIG. 1.

The procedures for direct path D2D communication are similar with the above-outlined steps and operations, while the difference essentially lies in the different communication paths. Namely, the data path between the D2D pair for locally-routed/optimized path is UE1 ⇔ eNB ⇔ UE2, while the data path for direct path is UE1 ⇔ UE2. However, the control plane path for RRC is the same, i.e. UE1 ⇔ eNB ⇔ UE2. Specifically, in the direct path case, the MME/DRSF decides to set up a direct communication path for the D2D pair and transmits a corresponding communication path setup request, and the eNB sets up the direct communication path between the pair of devices according to the request, i.e. the eNB establishes a D2D radio bearer for the D2D communication service between UE1 and UE2 and at least one control-plane related bearer between UE1 and/or UE2 and the eNB (without relation to or association with a S1 bearer). Further, any step or operation may be effected for one of the two devices (the one which has the D2D bearer to the eNB) instead of both devices, respectively.

Generally, for both locally-routed/optimized and direct path cases, in order to further reduce UE power consumption, it is possible that a (much) longer DRX cycle can be introduced in the RRC_CONNECTED state.

In case mobility happens to at least one UE of the D2D pair, e.g. a handover between different eNBs, during the ongoing D2D service (after termination of the CN communication service), i.e. after the procedure surrounded by the dashed box in FIG. 4, this mobility is not visible to the MME/DRSF, i.e. the EPC. This is because UE1 and/or UE2 will be seen to be in a non-connected state (i.e. ECM_IDLE) from EPC point of view, and only TA (Tracking Area) level information is visible in the EPC. In case any CN communication (e.g. EPS service) is triggered for UE1 and/or UE2, e.g. a mobile-terminated call, a paging procedure will be adopted by the EPC to find the corresponding UE1 and/or UE2. However, the serving eNB may respond to the paging message to the MME/DRSF without triggering any paging procedure at the RAN level, i.e. towards the UEs. Thereby, the core network involvement can be minimized, while appropriate managing the RRC state at the RAN level.

Figure 5:
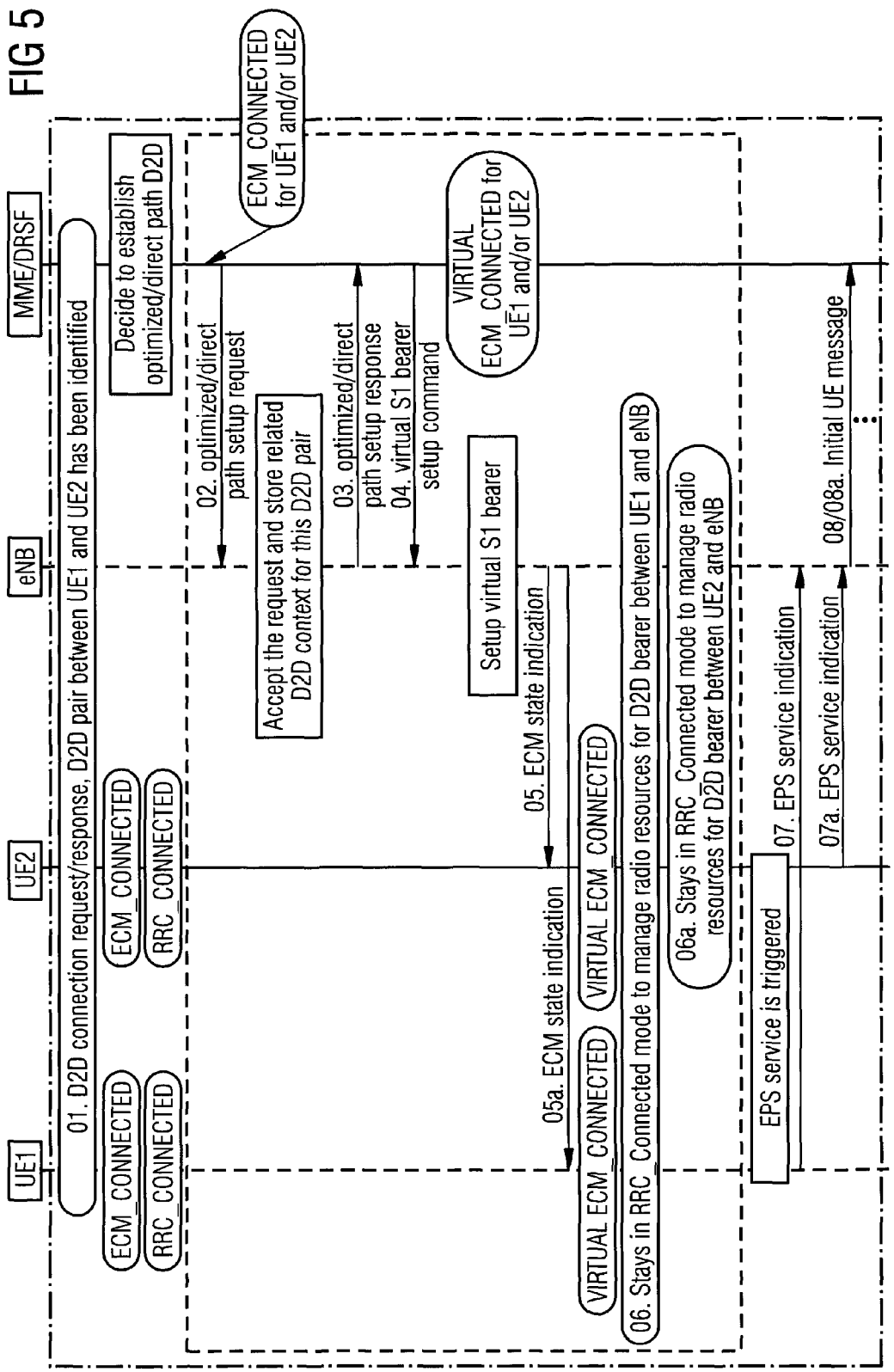
FIG. 5 shows a signaling diagram of a second example of a procedure according to exemplary embodiments of the present invention.

FIG. 5 shows a signaling diagram of a second example of a procedure according to exemplary embodiments of the present invention. Similar to FIG. 4, the exemplary procedure illustrated in FIG. 5 is based on the assumption of a D2D communication (service) between devices UE1 and UE2 under the locally-routed/optimized path or mode (in which both of the devices UE1 and UE2 have a D2D bearer to the eNB), as exemplified for devices UE1-2 and UE2-2 in the communication system scenario of FIG. 1.

In the procedure of FIG. 5, an approach is exemplified, in which the MME/DRSF enters UE1 and/or UE2 into a VIRTUAL ECM_CONNECTED state (representing an example of a non-connected ECM state resulting from CN connection reconfiguration) but the RRC state for UE1 and/or UE2 remains in RRC_CONNECTED at the eNB. In this procedure, the VIRTUAL ECM_CONNECTED state for UE1 and/or UE2 is attained by establishing a virtual S1 bearer between the eNB and the MME/DRSF.

As most of the steps and operation in the procedure of FIG. 5 correspond to respective steps and operation in the procedure of FIG. 4, reference is made to FIG. 4 for a detailed description thereof, which will not be repeated hereinafter. This specifically applies for all steps and operations except for steps 4 through 5 and related operations and associated ECM states.

In case the CN communication service of UE1 and/or UE2 comes to the end, the MME/DRSF could instruct the eNB to establish a virtual S1 bearer between the MME/DRSF and the eNB. That is, in step 4, the MME/DRSF issues and the eNB thus obtains a command for establishing the virtual bearer for the pair of devices between the eNB and the MME/DRSF. Such command may be implemented by a S1AP message which may be specifically defined for such purpose. Such S1AP message is configured to serve, i.e. to be associated/related with, no CN or EPS (e.g. S1 and/or S5) bearer between the eNB and the MME/DRSF. It is noted that this step of command transmission could be merged into step 2 of request transmission, if the CN communication service is already terminated at the beginning of step 2.

For example, as assumed in the procedure of FIG. 5, the MME/DRSF may detect termination of the core network communication service for the at least one device on its own (e.g. by sensing inactivity on all of related UE-dedicated bearers), and the eNB may detect such termination by way of obtaining a corresponding command from the MME/DRSF. Otherwise, the eNB may detect termination of the core network communication service for the at least one device on its own (e.g. by sensing inactivity on all of related UE-dedicated bearers), and the MME/DRSF may detect such termination by way of obtaining a corresponding command from the eNB. Upon receipt of such command or upon inactivity detection, the eNB reconfigures the CN connection towards the MME/DRSF for disabling the CN communication service of the at least one device by establishing the virtual bearer for the pair of devices towards the MME/DRSF. Such reconfiguration of the CN connection towards the eNB may then be determined by the MME/DRSF accordingly. The MME/DRSF may then maintain the virtual S1 bearer having been established in the thus determined CN connection reconfiguration.

Upon (detection of the need/desire for) such virtual S1 bearer establishment as an example of a CN connection reconfiguration according to exemplary embodiments of the present invention, the UE-related states may be managed as follows. The MME/DRSF sets a VIRTUAL ECM_CONNECTED state as an example of a non-connected ECM state for UE1 and UE2, while the eNB maintains the RRC_CONNECTED state for UE1 and UE2. The eNB may thus perform radio resource management (RRC control) for the D2D communication service for the at least one device on the set-up communication path when the RRC_CONNECTED state is maintained for the at least one device for which only the D2D communication service is active.

The virtual S1 bearer established in the above procedure is different from a dedicated S1 bearer in that it is designated to serve only D2D users. Hence, from MME/DRSF point of view, the at least one UE stays in a non-connected ECM state which could be regarded to be equivalent to ECM_IDLE in terms of management of radio resource control for D2D communication according to exemplary embodiments of the present invention.

In the context of virtual S1 bearer establishment, virtual bearer context information for the at least one device may be registered or stored at the eNB and/or the MME. Such virtual bearer context information may include one or more of identifiers of virtual bearer endpoints, at least one identifier for the associated pair of devices, and property information about the virtual bearer. For example, some essential context for the related UE or UEs may be stored in the MME/DRSF, and it could be indexed by maintaining the associated UE ID or UE IDs at both the eNB and the MME/DRSF. Such context information could for example be represented in form of any combination of the following parameters:

Virtual MME UE S1AP ID
    Virtual eNB UE S1AP ID
    D2D pair ID
    Virtual S1 bearer info
    Virtual S1 bearer QoS parameters
    Virtual Transport layer address
    Virtual GTP-TEID
    . . . .

In step 5, the eNB may then set the VIRTUAL ECM_CONNECTED state for UE1 and/or UE2, whereby the CN connection management for the at least one device is disabled, and may optionally indicate the setting of the VIRTUAL ECM_CONNECTED state to UE1 and/or UE2. Correspondingly, UE1 and/or UE2 will be optionally informed for VIRTUAL ECM_CONNECTED state held by the MME/DRSF based on the indication from the eNB. It is to be noted that at this time the MME/DRSF is not maintaining any S1 bearer any more due to no CN communication service happening between UE1/UE2 and the MME/DRSF.

Although UE1 and UE2 will thus be seen to be in VIRTUAL ECM_CONNECTED state from MME/DRSF point of view, both UE1 and UE2 will still remain in RRC_CONNECTED state. As shown as step 6, both UE1 and UE2 stay in RRC_CONNECTED state with respect to their D2D bearers to the eNB, respectively. Thus, it is still enabled to manage radio resources for the locally-routed/optimized path D2D service between UE1/UE2 and eNB. For example, for both UE1 and UE2, at least one radio bearer for the D2D service is established/activated between this UE and the eNB. In this case, the RRC connection between this UE and the eNB is valid only for managing D2D services on the air interface while there is no relationship/association with any CN communication service any more, e.g. no NAS messages will be transmitted in this RRC connection and no EPS bearers will be active.

In case at a later time at least one of the D2D pair decides to initiate a CN communication such as e.g. an EPS service, UE1 and/or UE2 could indicate such CN communication (e.g. EPS service) request to the eNB via the remaining RRC connection using any uplink RRC messages (e.g. measurement report or uplink information transfer). Then, the eNB will issue an initial UE message to the MME/DRSF based on legacy procedures to re-establish the CN communication (e.g. the EPS service). Otherwise, the network side may initiate a CN communication such as e.g. an EPS service over the configured virtual S1 bearer via the eNB without a need of sending an indication to the eNB beforehand. This is feasible, as UE1 and UE2 are held in the VIRTUAL ECM_CONNECTED state (instead of the ECM_IDLE state, as in the case of FIG. 4).

Similar to FIG. 4, the exemplary procedure illustrated in FIG. 5 is similarly applicable for a D2D communication (service) between devices UE1 and UE2 under the direct path or mode (in which one or both of the devices UE1 and UE2 may have a control-plane bearer to the eNB, i.e. at least one of UE1 and UE2 is in RRC_CONNECTED state), as exemplified for devices UE1-1 and UE2-1 in the communication system scenario of FIG. 1. In this regard, reference is made to the corresponding in connection with FIG. 4 above accordingly.

Generally, for both locally-routed/optimized and direct path cases, in order to further reduce UE power consumption, it is possible that a (much) longer DRX cycle can be introduced in the RRC_CONNECTED state.

In case mobility happens to at least one UE of the D2D pair, e.g. a handover between different eNBs, during the ongoing D2D service (after termination of the CN communication service), i.e. after the procedure surrounded by the dashed box in FIG. 5, this mobility is visible to the MME/DRSF, i.e. the EPC. This is because UE1 and/or UE2 will be seen to be in the VIRTUAL ECM_CONNECTED state from EPC point of view, and the virtual S1 bearer will be involved to execute the mobility (e.g. handover) procedure accordingly. Thereby, the core network is involved more than in the approach according to FIG. 4, but the present approach is effective to keep the EPC, e.g. the MME/DRSF, in good knowledge of the status of the D2D service, and it is more quickly to transform the D2D communication mode back to the infrastructure mode. Also, the paging signaling overhead can be reduced due to the connected eNB information for the UE or UEs in the D2D communication.

According to exemplary embodiments of the present invention, the virtual bearer may be established as a common bearer for plural pairs of devices having an active D2D communication service. That is, it is possible that the virtual S1 bearer is implemented as a common S1 bearer which is established and shared between the eNB and the MME/DRSF by different D2D pairs. The common S1 bearer may be a logical bearer corresponding to an actual S1 bearer (with full S1 bearer parameters) or sort of virtual S1 bearer (with only a part of S1 bearer parameters). In such case, individual UEs could be identified/multiplexed based on e.g. unique MME/eNB UE S1AP ID (also possibly together with D2D pair ID). All D2D pair UEs could then utilize this common S1 bearer to serve separate D2D services. Even in case UE-dedicated EPS (S1) bearers are released between the eNB and the MME/DRSF, which means that the MME/DRSF puts UE1 and/or UE2 into the ECM_IDLE state (as illustrated in the procedure of FIG. 4), the common S1 bearer for D2D services could still be maintained for different D2D pairs. Specifically, the common S1 bearer may be maintained by the MME/DRSF for any activated D2D service among different D2D pairs. The activated common S1 bearer could speed up the switching-back operation from the D2D communication mode back to the infrastructure mode, wherein such resuming may be more effective than re-establishing a new association (between EPS bearers and RRC connections) in a top-down manner.

In both approaches according to FIGS. 4 and 5, i.e. in step 6 thereof, the at least one UE sees itself in connected state even though the MME/DRSF has put it into a non-connected (ECM) state. Thus, the at least one UE can do anything in the same way as in the case when it is actually in a connected state (e.g. handover, NAS signaling transfer etc.). The eNB may take care of the rest accordingly (for example, in case of handover the eNB does not send a path switching request to the MME/DRSF, in case of NAS signaling transfer the eNB requests a dedicated S1 bearer, etc.) when the eNB detects that the UE-dedicated S1 connection is not available (i.e. the MME has put the at least one UE in the non-connected ECM state).

By virtue of exemplary embodiments of the present invention, as outlined above, an effective management of radio resource control for D2D communication is provided. Namely, it is enabled to manage radio resource, or to manage radio resource control states, for D2D communication to support such radio resource management without a requirement or restriction that a core network communication needs to be established for at least one device involved in the D2D communication.

By way of the above-described methods and procedures, it is taught how to manage the RRC state for D2D UEs in a D2D communication under locally-routed/optimized path or direct path when no core network service (such as an EPS service or a NAS service) is happening in either one of the UEs of the D2D pair. Accordingly, a RRC connection between the UE/UEs of the D2D pair and the RAN base station can be maintained, and no additional separate RRC connection is needed for the D2D service, which could make implementations with both D2D communication mode and infrastructure mode more simple and feasible. Thereby, signaling and processing overhead of the core network may be reduced or even eliminated, while allowing D2D users to re-establish or resume the core network service (such as an EPS service or a NAS service) whenever necessary during the D2D communication service.

By way of the above-described methods and procedures, the scope of the RRC_CONNECTED state may be extended to cover radio resource management for a D2D service (in addition to radio resource management for a core network service). That is, the RRC_CONNECTED state may prevail not only for core network services, but also for D2D services in a D2D communication under locally-routed/optimized path or direct path. Thereby, resource management for a D2D service is feasible by way of the extended RRC_CONNECTED state even if no core network service is active. Accordingly, a faster transition from the D2D communication mode under locally-routed/optimized path or direct path to the infrastructure mode is enabled.

The above-described methods, procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 6, while for the sake of brevity reference is made to the detailed description of respective corresponding configurations/setups, schemes, methods and functionality, principles and operations according to FIGS. 1 to 5.

Figure 6:
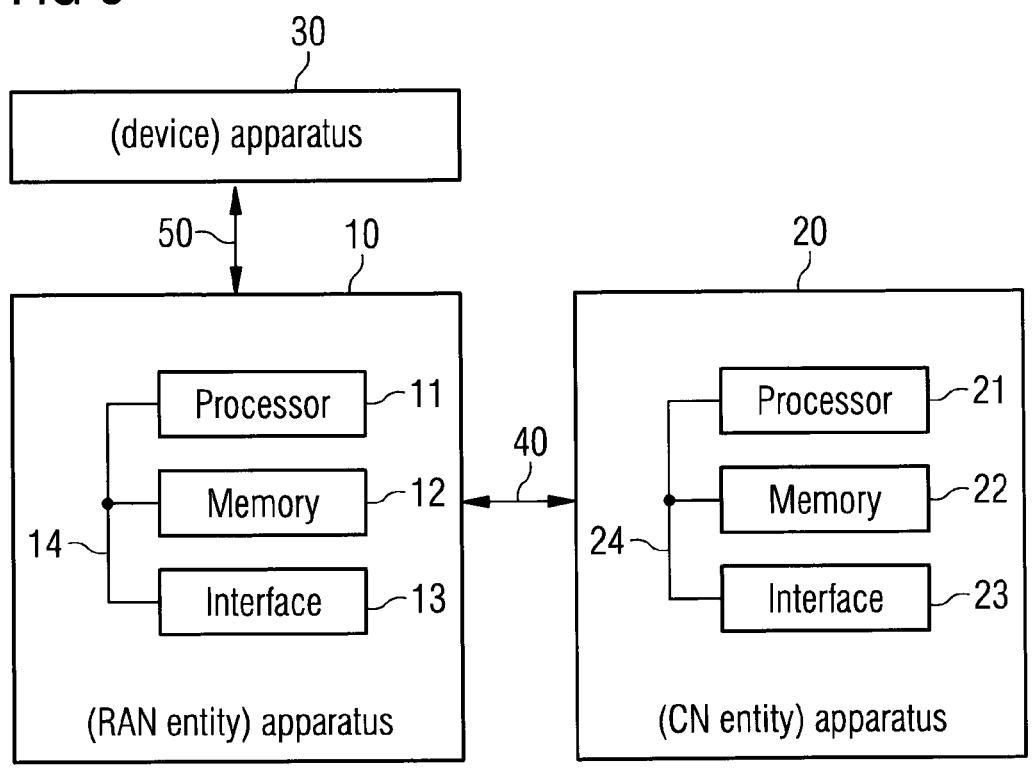
FIG. 6 shows a schematic diagram illustrating apparatuses according to exemplary embodiments of the present invention.

In FIG. 6, the solid line blocks are basically configured to perform respective operations as described above. The entirety of solid line blocks are basically configured to perform the methods and operations as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 6, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 6 shows a schematic diagram illustrating apparatuses according to exemplary embodiments of the present invention.

In view of the above, the thus illustrated apparatuses 10 and 20 are suitable for use in practicing the exemplary embodiments of the present invention, as described herein. Namely, any one of apparatuses 10 and 20 represents an apparatus which is configured for managing radio resource control, i.e. which has means, circuitry, functional units or the like, which are adapted to enable/realize RRC management in/for D2D communication.

The thus illustrated apparatus 10 may represent a (part of a) RAN entity, such as a base station or eNB, according to exemplary embodiments of the present invention, and it may be configured to perform a procedure and/or exhibit a functionality as described (for the eNB) in any one of FIGS. 1, 2, 4 and 5. The thus illustrated apparatus 20 may represent a (part of a) CN entity, such as a MME and/or a DRSF, according to exemplary embodiments of the present invention, and it may be configured to perform a procedure and/or exhibit a functionality as described (for the MME/DRSF) in any one of FIGS. 1, 3, 4 and 5. The thus illustrated apparatus 30 may represent a (part of a) device, such as a terminal or user equipment, according to exemplary embodiments of the present invention, and it may be configured to perform a procedure and/or exhibit a functionality as described (for any UE) in any one of FIGS. 1, 4 and 5.

Referring to the exemplary communication system scenario of FIG. 1, the RAN entity apparatus 10 may be connected to the CM network entity apparatus 20 by a link 40 which may implement a CN connection (such as a S1 interface), and the RAN entity apparatus 10 may be connected to the device apparatus 30 by a link 50 which may implement a RRC connection. Thereby, the device apparatus 30 may have a signaling connection to the CN entity apparatus 20 via the RAN entity apparatus 10.

As indicated in FIG. 6, according to exemplary embodiments of the present invention, the apparatuses 10 and 20 may comprise at least one processor 11/21 and at least one memory 12/22 (and possibly also at least one interface 13/23), which may be connected by a bus 14/24 or the like, respectively. Although not illustrated in FIG. 6, the apparatus 30 may be constructed in a similar manner as the apparatuses 10 and 20.

The processor 11/21 and/or the interface 13/23 of any apparatus may also include a modem or the like to facilitate communication over a (hardwire or wireless) link, respectively.

The interface 13/23 of any apparatus may include a suitable transceiver coupled to one or more antennas or communication means for (hardwire or wireless) communications with the linked or connected device(s), respectively. The interface 13/23 of any apparatus is generally configured to communicate with at least one other apparatus, as illustrated by respective links in FIG. 6.

The memory 12/22 of any apparatus may store respective programs assumed to include program instructions or computer program code that, when executed by the respective processor, enables the respective electronic device or apparatus to operate in accordance with the exemplary embodiments of the present invention. For example, the memory 12/22 of any apparatus may store status information of a RRC and/or ECM status of one of more devices, context information mentioned above, virtual bearer information, identifier information for devices and/or device pairs, or the like.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "processor configured to [cause the apparatus to] perform xxx-ing" is construed to be equivalent to an expression such as "means for xxx-ing").

In its most basic form, according to exemplary embodiments of the present invention, the apparatus 10 or its processor 11 (possibly together with computer program code stored in the memory 12) is configured to perform setting a connected state of radio resource control for at least one device of a pair of devices, for which at least one device both a device-to-device communication service between the pair of devices and a core network communication service between the at least one device and a core network entity are active, said setting enabling radio resource management for the at least one device for the device-to-device communication service and the core network communication service, detecting termination of the core network communication service for the at least one device, reconfiguring a connection towards the core network entity for disabling the core network communication service of the at least one device, and maintaining the connected state of radio resource control for the at least one device of the pair of devices, for which at least one device only the device-to-device communication service is active, said maintaining enabling radio resource management for the at least one device for the device-to-device communication service.

Accordingly, stated in other words, the apparatus 10 at least comprises respective means for setting a connected state of radio resource control for at least one device of a pair of devices, means for detecting termination of the core network communication service for the at least one device, means for reconfiguring a connection towards the core network entity for disabling the core network communication service of the at least one device, and means for maintaining the connected state of radio resource control for the at least one device of the pair of devices.

According to various modifications and/or developments, the apparatus 10 or its processor 11 (possibly together with computer program code stored in the memory 12) is configured to perform, or—stated differently—comprises means for obtaining a request for setting up a communication path between the pair of devices for the device-to-device communication service from the core network entity, said request comprising device-to-device context information for the pair of devices, and setting up the communication path between the pair of devices on the basis of the device-to-device context information for the pair of devices, and/or establishing a radio bearer for the device-to-device communication service to any one of the devices of the pair of devices, or establishing a radio bearer for the device-to-device communication service between the pair of devices, and/or performing radio resource management for the device-to-device communication service for the at least one device on the set-up communication path when the connected state is maintained for the at least one device for which only the device-to-device communication service is active, and/or releasing all of active device-dedicated bearers of the at least one device towards the core network entity, and/or obtaining a command for releasing all of active device-dedicated bearers of the at least one device towards the core network entity, and/or sensing inactivity on all active device-dedicated bearers of the at least one device towards the core network entity, and/or setting an idle state of core network connection management for the at least one device, said setting disabling core network connection management for the at least one device, and indicating the setting of the idles state of core network connection management to the at least one device, and/or establishing a virtual bearer for the pair of devices towards the core network entity, said virtual bearer being different from a device-dedicated bearer of the at least one device towards the core network entity, and/or obtaining a command for establishing the virtual bearer for the pair of devices towards the core network entity, and/or sensing inactivity on all of active device-dedicated bearers of the at least one device towards the core network entity, and/or setting a virtual connected state of core network connection management for the at least one device, said setting disabling connection management for the at least one device, and indicating the setting of the virtual connected state of core network connection management to the at least one device, and/or registering virtual bearer context information for the at least one device, including one or more of identifiers of virtual bearer endpoints, at least one identifier for the associated pair of devices, and property information about the virtual bearer.

In its most basic form, according to exemplary embodiments of the present invention, the apparatus 20 or its processor 21 (possibly together with computer program code stored in the memory 22) is configured to perform setting a connected state of core network connection management for at least one device of a pair of devices, for which at least one device both a device-to-device communication service between the pair of devices and a core network communication service between the at least one device and a core network entity are active, said setting enabling core network connection management for the at least one device, detecting termination of the core network communication service for the at least one device, determining reconfiguration of a connection towards a radio access network entity for disabling the core network communication service of the at least one device, and setting a non-connected state of core network connection management for the at least one device of the pair of devices, for which at least one device only the device-to-device communication service is active, said setting disabling core network connection management for the at least one device.

Accordingly, stated in other words, the apparatus 10 at least comprises respective means for setting a connected state of core network connection management for at least one device of a pair of devices, means for detecting termination of the core network communication service for the at least one device, means for determining reconfiguration of a connection towards a radio access network entity for disabling the core network communication service of the at least one device, and means for setting a non-connected state of core network connection management for the at least one device of the pair of devices.

According to various modifications and/or developments, the apparatus 20 or its processor 21 (possibly together with computer program code stored in the memory 22) is configured to perform, or—stated differently—comprises means for issuing a request for setting up a communication path between the pair of devices for the device-to-device communication service towards the radio access network entity, said request comprising device-to-device context information for the pair of devices, and/or determining a release of all of active device-dedicated bearers of the at least one device towards the radio access network entity, wherein an idle state of core network connection management is set as the non-connected state of core network connection management, and/or obtaining a command for releasing all of active device-dedicated bearers of the at least one device towards the radio access network entity, and/or sensing inactivity on all of active device-dedicated bearers of the at least one device towards the radio access network entity, and/or determining establishment of a virtual bearer for the pair of devices towards the radio access network entity, said virtual bearer being different from a device-dedicated bearer of the at least one device towards the radio access network entity, wherein a virtual connected state of core network connection management is set as the non-connected state of core network connection management, and/or obtaining a command for establishing the virtual bearer for the pair of devices towards the radio access network entity, and/or sensing inactivity on all of active device-dedicated bearers of the at least one device towards the radio access network entity, and/or registering virtual bearer context information for the pair of devices, including one or more of identifiers of virtual bearer endpoints, at least one identifier for the associated pair of devices, and property information about the virtual bearer.

For further details regarding the operability/functionality of the individual apparatuses, reference is made to the above description in connection with any one of FIGS. 2 to 5, respectively.

According to exemplarily embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for management of radio resource control for device-to-device communication. Such measures exemplarily comprise setting a connected state of radio resource control for at least one device of a pair of devices, for which at least one device both a device-to-device communication service between the pair of devices and a core network communication service between the at least one device and a core network entity are active, said setting enabling radio resource management for the at least one device for the device-to-device communication service and the core network communication service, detecting termination of the core network communication service for the at least one device, reconfiguring a connection towards the core network entity for disabling the core network communication service of the at least one device, and maintaining the connected state of radio resource control for the at least one device of the pair of devices, for which at least one device only the device-to-device communication service is active, said maintaining enabling radio resource management for the at least one device for the device-to-device communication service.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP $3^{rd}$ Generation Partnership Project
AP Access Point
eNB evolved Node B (E-UTRAN base station)
CN Core Network
D2D Device to Device
DRSF D2D Registration Server Function
DRX Discontinuous Reception
ECM EPS Connection Management
EPC Evolved Packet Core
EPS Evolved Packet System
E-UTRAN Evolved UTRAN
GTP GPRS Tunneling Protocol
ID Identifier
LTE Long Term Evolution
LTE-A Long Term Evolution Advanced
MME Mobility Management Entity
NAS Non-Access Stratum
PDU Protocol Data Unit
QoS Quality of Service
RAN Radio Access Network
RRC Radio Resource Control
S1AP S1 Application Protocol
TA Timing Advance
TEID Tunnel Endpoint Identifier
UE User Equipment
UMTS Universal Mobile Telecommunications System
UTRAN UMTS Terrestrial Radio Access Network

The invention claimed is:

1. An apparatus, comprising
a memory configured to store computer program code, and
a processor,
the memory and the computer program code configured, with the processor, to cause the apparatus to perform operations comprising;
setting a connected state of radio resource control for at least one device of a pair of devices, for which at the least one device both a device-to-device communication service between the pair of devices and a core network communication service between the at least one device and a core network entity are active, said setting enabling radio resource management for the at least one device for the device-to-device communication service and the core network communication service, detecting termination of the core network communication service for the at least one device, reconfiguring a connection towards the core network entity for disabling the core network communication service of the at least one device, maintaining the connected state of radio resource control for the at least one device of the pair of devices, for which the at least one device only the device-to-device communication service is active, said maintaining enabling radio resource management for the at least one device for the device-to-device communication service, establishing a virtual bearer for the pair of devices towards the core network entity, said virtual bearer being different from a device-dedicated bearer of the at least one device towards the core network entity, and registering virtual bearer context information for the at least one device, including one or more of identifiers of virtual bearer endpoints, at least one identifier for the associated pair of devices, and property information about the virtual bearer.

2. The apparatus according to claim 1, wherein the memory and the computer program code are further configured, with the processor, to cause the apparatus to perform:
obtaining a request for setting up a communication path between the pair of devices for the device-to-device communication service from the core network entity, said request comprising device-to-device context information for the pair of devices, and
setting up the communication path between the pair of devices on the basis of the device-to-device context information for the pair of devices.

3. The apparatus according to claim 2, wherein the memory and the computer program code are further configured, with the processor, to cause the apparatus to perform:
performing radio resource management for the device-to-device communication service for the at least one device on the set-up communication path when the connected state is maintained for the at least one device for which only the device-to-device communication service is active.

4. The apparatus according to claim 1, wherein the memory and the computer program code are further configured, with the processor, to cause the apparatus to perform:
releasing all of active device-dedicated bearers of the at least one device towards the core network entity.

5. The apparatus according to claim 4, wherein the memory and the computer program code are further configured, with the processor, to cause the apparatus to perform:
obtaining a command for releasing all of the active device-dedicated bearer of the at least one device towards the core network entity, and/or
sensing inactivity on all of the active device-dedicated bearers of the at least one device towards the core network entity.

6. The apparatus according to claim 4, wherein the memory and the computer program code are further configured, with the processor, to cause the apparatus to perform:
setting an idle state of core network connection management for the at least one device, said setting disabling core network connection management for the at least one device, and
indicating the setting of the idle state of core network connection management to the at least one device.

7. The apparatus according to claim 1, wherein the memory and the computer program code are further configured, with the processor, to cause the apparatus to perform:
obtaining a command for establishing the virtual hearer for the pair of devices towards the core network entity, and/or
sensing inactivity on all of active device-dedicated bearers of the at least one device towards the core network entity.

8. The apparatus according to claim 1, wherein the memory and the computer program code are further configured, with the processor, to cause the apparatus to perform:
setting a virtual connected state of core network connection management for the at least one device, said setting disabling connection management for the at least one device, and indicating the setting of the virtual connected state of core network connection management to the at least one device.

9. The apparatus according to claim 1, wherein the virtual bearer is established as a common bearer for plural pairs of devices having an active device-to-device communication service.

10. The apparatus according to a claim 1, wherein
the apparatus is operable as or at a base station of a cellular communication system, and/or
any one of the pair of devices is a terminal or user equipment operable at least in the cellular communication system, and/or
the core network entity is a mobility management entity and/or a device-to-device registration server function, and/or
the core network communication service is at least one of an evolved packet system service and a non-access stratum service.

11. An apparatus, comprising
a memory configured to store computer program code, and
a processor,
the memory and the computer program code configured, with the processor, to cause the apparatus to perform:
setting a connected state of core network connection management for at east one device of a pair of devices, for which the at least one device both a device-to-device communication service between the pair of devices and a core network communication service between the at least one device and a core network entity are active, said setting enabling core network connection management for the at least one device,
detecting termination of the core network communication service for the at least one device,
determining reconfiguration of a connection towards a radio access network entity for disabling the core network communication service: of the at least one device,
setting a non-connected state of core network connection management for the at least one device of the pair of devices, for which the at least one device only the device-to-device communication service is active, said setting disabling core network connection management for the at least one devices,
determining establishment of a virtual bearer for the pair of devices towards the radio access network entity, said virtual bearer being different from a device-dedicated bearer of the at least one device towards the radio access network entity,
wherein a virtual connected state of core network connection management is set as the non-connected state of core network connection management, and
registering virtual bearer context information for the pair of devices, including one or more of identifiers of virtual bearer endpoints, at east one identifier for the associated pair of devices, and property information about the virtual bearer.

12. The apparatus according to claim 11, wherein the memory and the computer program code are further configured, with the processor, to cause the apparatus to perform:
issuing a request for setting up a communication path between the pair of devices for the device-to-device communication service towards the radio access network entity, said request comprising device-to-device context information for the pair of devices.

13. The apparatus according to claim 11, wherein the memory and the computer program code are further configured, with the processor, to cause the apparatus to perform:
determining a release of all of active device-dedicated bearers of the at least one device towards the radio access network entity,
wherein an idle state of core network connection management is set as the non-connected state of core network connection management.

14. The apparatus according to claim 13, wherein the memory and the computer program code are further configured, with the processor, to cause the apparatus to perform:
obtaining a command for releasing all of the active device-dedicated bearer of the at least one device towards the radio access network entity, and/or
sensing inactivity on all of the active device-dedicated bearers of the at least one device towards the radio access network entity.

15. The apparatus according to claim 11, wherein the memory and the computer program code are further configured, with the processor, to cause the apparatus to perform:
obtaining a command for establishing the virtual bearer for the pair of devices towards the radio access network entity, and/or sensing inactivity on all of the active device-dedicated bearers of the at least one device towards the radio access network entity.

16. The apparatus according to claim 11 wherein
the apparatus is operable as or at the core network entity of a cellular communication system, and/or
any one of the pair of devices is a terminal or user equipment operable at least in the cellular communication system, and/or
the core network entity is a mobility management entity and/or a device-to-device registration server function, and/or
the core network communication service is at least one of an evolved packet system service and a non-access stratum service, and/or
the radio access network entity is a base station of the cellular communication system.

17. A method, comprising:
setting a connected state of radio resource control for at least one device of a pair of devices, for which at least one device both a device-to-device communication service between the pair of devices and a core network communication service between the at least one device and a core network entity are active, said setting enabling radio resource management for the at least one device for the device-to-device communication service and the core network communication service,
detecting termination of the core network communication service for the at least one device,
reconfiguring a connection towards the core network entity for disabling the core network communication service of the at least one device,
maintaining the connected state of radio resource control for the at least one device of the pair of devices, for which at least one device only the device-to-device communication service is active, said maintaining enabling radio resource management for the at least one device for the device-to-device communication service,
establishing a virtual bearer for the pair of devices towards the core network entity, said virtual bearer being different from a device-dedicated bearer of the at least one device towards the core network entity, and
registering virtual bearer context information for the at least one device, including one or more of identifiers of virtual bearer endpoints, at least one identifier for the associated pair of devices, and property information about the virtual bearer.

18. A computer program product comprising a non-transitory computer-readable medium comprising computer-executable program code, which is configured to cause a computer to carry out the method according to claim 17 when the program code is executed by the computer.

19. A method, comprising:
setting a connected state of core network connection management for at least one device of a pair of devices, for which at least one device both a device-to-device communication service between the pair of devices and a core network communication service between the at least one device and a core network entity are active, said setting enabling core network connection management for the at least one device,
detecting termination of the core network communication service for the at least one device,
determining reconfiguration of a connection towards a radio access network entity for disabling the core network communication service of the at least one device,
setting a non-connected state of core network connection management for the at least one device of the pair of devices, for which at least one device only the device-to-device communication service is active, said setting disabling core network connection management for the at least one device,
determining establishment of a virtual bearer for the pair of devices towards the radio access network entity, said virtual bearer being different from a device-dedicated bearer of the at least one device towards the radio access network entity,
wherein a virtual connected state of core network connection management is set as the non-connected state of core network connection management, and
registering virtual bearer context information for the pair of devices, including one or more of identifiers of virtual bearer endpoints, at least one identifier for the associated pair of devices, and property information about the virtual bearer.

20. A computer program product comprising a non-transitory computer-readable medium comprising computer-executable program code, which is configured to cause a computer to carry out the method according to claim 19 when the program code is executed by the computer.

* * * * *

UNITED STATES PATENT AND TRADEMARK OFFICE
CERTIFICATE OF CORRECTION

PATENT NO.        : 9,775,185 B2
APPLICATION NO.   : 14/764613
DATED             : September 26, 2017
INVENTOR(S)       : Ling Yu et al.

It is certified that error appears in the above-identified patent and that said Letters Patent is hereby corrected as shown below:

In the Claims

In Claim 7:
Column 23, Line 67, "hearer" should be deleted and --bearer-- should be inserted.

In Claim 11:
Column 24, Line 36, "east" should be deleted and --least-- should be inserted.

In Claim 11:
Column 24, Line 54, "devices" should be deleted and --device-- should be inserted.

In Claim 11:
Column 24, Line 65, "east" should be deleted and --least-- should be inserted.

Signed and Sealed this
Twenty-seventh Day of March, 2018

Andrei Iancu
*Director of the United States Patent and Trademark Office*